(12) United States Patent
Nakagawa et al.

(10) Patent No.: US 6,210,793 B1
(45) Date of Patent: Apr. 3, 2001

(54) ELECTRICALLY CHARGEABLE SUBSTRATE

(75) Inventors: Tohru Nakagawa, Shiga; Yasuo Takebe, Osaka; Norihisa Mino, Nara, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/976,302

(22) Filed: Nov. 21, 1997

(51) Int. Cl.$^7$ .............................. B32B 17/00; G09F 7/02; G09F 7/12
(52) U.S. Cl. .............................. 428/336; 29/559; 29/900; 40/594; 40/611; 40/618; 156/273.1; 428/333; 428/429; 428/447; 428/451
(58) Field of Search ........................ 29/559, 900; 40/594, 40/611, 618; 156/273.1; 428/333, 429, 447, 431, 336

(56) References Cited

U.S. PATENT DOCUMENTS 5,284,707 * 2/1994 Ogawa et al. ........................ 428/333
5,372,888 * 12/1994 Ogawa et al. ........................ 428/422

* cited by examiner

*Primary Examiner*—D. S. Nakarani
(74) *Attorney, Agent, or Firm*—Merchant & Gould P.C.

(57) ABSTRACT

A thin film composed of a silane-based compound comprising an alkyl group or a fluoroalkyl group is bonded to the surface of an electrically insulating substrate through a covalent bond, thus obtaining an electrically chargeable substrate maintaining a charged state for a long time regardless of relative humidity of an atmosphere. A glass plate for placing a sheet in an overhead projector is dipped into a solution comprising $CF_3(CF)_7(CH_2)_2SiCl_3$. As a result, a molecular composed of $CF_3(CF_2)_7(CH_2)_2Si(O)_3$—is chemically bonded to the glass surface. A high charged state, a water-repelling property having a static contact angle of pure water on the thin film formed on the glass surface of 110 degrees and a volume electric resistivity in the range of $1\times10^{11}$–$1\times10^{19}\Omega\cdot cm$ are provided.

22 Claims, No Drawings

ELECTRICALLY CHARGEABLE SUBSTRATE

FIELD OF THE INVENTION

This invention relate to an electrically chargeable material used in an adhesion device, an overhead projector (hereafter referred to as an OHP), a bulletin device, a drafting machine, a plotter device or the like so that a paper, a vinyl sheet or the like adheres in a predetermined position.

BACKGROUND OF THE INVENTION

A material having a volume electric resistivity of $1 \times 10^{11} \Omega \cdot cm$ or more can be charged with accumulated charges on the surface by being rubbed with ceramics, glass, resin or the like or by causing a corona discharge or the like. A material capable of accumulating charges on a surface is referred to as an electrically chargeable material and can be applied to various uses. For example, there is an adhesion device that makes a paper, a vinyl sheet or the like adhere utilizing the electrostatic force of a charged material. In the case where a plate for placing a sheet in an OHP is made of glass, the glass and the sheet can be individually charged by rubbing the OHP sheet onto the glass strongly, thus providing an overhead projector in which an OHP sheet does not slip down from the glass surface. Similarly, adhesion of a paper, a vinyl sheet or the like to a dielectric bulletin board, a dielectric drafting board for placing a drawing paper, and a dielectric plate for placing a paper for a plotter device can be realized in the same way, thus creating convenience that, for example, an OHP sheet does not slip down during presentation, or a sheet can be placed on a bulletin board, a drafting board and a plate for placing a paper in a plotter device without using a pressure sensitive adhesive tape or magnets. Theoretically, adhesion of a paper, a vinyl sheet or the like can be realized by charging the surface via rubbing a dielectric material and by utilizing electrostatic forces of the charged material.

However, a charge being accumulated generally escapes from a material easily, since a surface charge of a dielectric material escapes into a substance in contact with the material by means of ions (for example, carbonate ions, sodium ions or chloride ions that originally are present in the air and are dissolved in adsorbed water) in adsorbed water existing on the surface of the dielectric material. This phenomenon is seen especially in the case where humidity of an atmosphere is high and the surface of a dielectric material is hydrophilic. Conventionally, an effective surface treatment in order to prevent this phenomenon for the OHP sheet or the like has not been practiced.

SUMMARY OF THE INVENTION

Objects of the present invention are to solve the conventional problem mentioned above and to provide an electrically chargeable substrate maintaining a charged state for a long time regardless of humidity of an atmosphere.

In order to achieve the objects mentioned above, an electrically chargeable substrate of the present invention is characterized in that a thin film composed of a silane-based compound comprising an alkyl group or a fluoroalkyl group is bonded to the surface of an electrically insulating substrate through a covalent bond.

In the electrically chargeable substrate, it is preferable that the covalent bond is a siloxane bond expressed by Si—O—.

In the electrically chargeable substrate, it also is preferable that the silane-based compound is at least one compound selected from a chlorosilane-based compound, an ethoxysilane-based compound and a methoxysilane-based compound.

Furthermore, in the electrically chargeable substrate, it is preferable that the silane-based compound is a linear compound.

In the electrically chargeable substrate, it is preferable that the silane-based compound comprising an alkyl group is $CH_3(CH_2)_nSi(O-)_3$ (wherein n is 0~25).

In the electrically chargeable substrate, it also is preferable that the silane-based compound comprising a fluoroalkyl group is $CF_3(CF_2)_n(CH_2)_2Si(O-)_3$ (wherein n is 0~25).

In the electrically chargeable substrate, it is preferable that the electrically insulating substrate is at least one substrate selected from glass, plastic and ceramic.

In the electrically chargeable substrate, it is preferable that the electrically insulating substrate is at least one substrate selected from a plate for placing a sheet in an OHP, a bulletin board of a bulletin device, a drafting board of a drafting machine, and a plate for placing a paper in a plotter device.

In the electrically chargeable substrate, it is preferable that a volume electric resistivity of the electrically insulating substrate on which a thin film has not been formed yet is in the range of $1 \times 10^7 \sim 1 \times 10^{19} \Omega \cdot cm$.

In the electrically chargeable substrate, it is preferable that the thickness of the thin film is in the range of 1~100 nm.

In the electrically chargeable substrate, it is preferable that the thickness of the thin film is in the range of 4~30 nm.

In the electrically chargeable substrate, it is preferable that the contact angle between the thin film and water is in the range of 80~180 degrees.

In the electrically chargeable substrate, it is preferable that a volume electric resistivity of the thin film is in the range of $1 \times 10^{11} \sim 1 \times 10^{19} \Omega \cdot cm$. Practically, a volume electric resistivity of the thin film is preferably in the range of $1 \times 10^{13} \sim 1 \times 10^{18} \Omega \cdot cm$.

In the electrically chargeable substrate, it further is preferable that the silane-based compound is bonded to the surface of the electrically insulating substrate by at least one reaction selected from a dehydrochlorination reaction and a dealcoholization reaction.

DETAILED DESCRIPTION OF THE INVENTION

According to the electrically chargeable substrate of the present invention, a chemical adsorption film composed of a silane-based compound comprising an alkyl group or a fluoroalkyl group is bonded to the surface of an electrically insulating substrate such as, for example, glass, plastic or ceramic through a covalent bond, for example, a siloxane bond expressed by Si—O— or a bond expressed by Si—N—. Consequently, the thin film does not easily peel off from the substrate, since the thin film is tightly bonded to the electrically insulating substrate, thus obtaining an electrically chargeable substrate maintaining a charged state for a long time regardless of humidity of an atmosphere. That is to say, the thin film restrains the amount of adsorbed water on the substrate, and as a result the escape of the charges accumulated on the surface of the substrate from the surface through the adsorbed water also is restrained, thus maintaining a charged state.

According to a preferable example of the present invention in which the silane-based compound comprises a vinyl group or an acetyl group, after forming a thin film, the strength of the thin film can be improved by crosslinking through electron beam irradiation.

According to a preferable example of the present invention in which the silane-based compound is a chlorosilane-based compound, an ethoxysilane-based compound or a methoxysilane-based compound, a thin film excellent in transparency can be tightly bonded, since a monomolecular film can be easily formed.

According to a preferable example of the present invention in which the silane-based compound is a linear compound, the density of the film can be improved.

According to a preferable example of the present invention in which the electrically insulating substrate is a substrate selected from a plate for placing a sheet in an OHP, a bulletin board of a bulletin device, a drafting board of a drafting machine, and a plate for placing a paper in a plotter device, each device can be provided in which a paper, a vinyl sheet or the like can adhere easily regardless of the humidity of an atmosphere, a charged state can be maintained for a long time, and dirt adhering can be removed easily.

As described above, according to the electrically chargeable substrate of the present invention, a chemical adsorption film composed of a silane-based compound comprising an alkyl group or a fluoroalkyl group is bonded to the surface of an electrically insulating substrate through a covalent bond. Consequently, the thin film does not easily peel off from the substrate, since the thin film is tightly bonded to the electrically insulating substrate, thus providing an electrically chargeable substrate maintaining a charged state for a long time regardless of the humidity of an atmosphere. Therefore, in the case of using the electrically chargeable substrate in an adhesion device, an overhead projector, a bulletin device, a drafting machine or a plotter device, the effects can be obtained that a paper, a vinyl sheet or the like can adhere easily and that pencil, marker ink, finger marks or the like can be removed easily.

EXAMPLES

The present invention will be concretely explained using examples as follows.

A thin film capable of covering a surface of a solid includes, for example, a thin film formed by a silane-based surfactant. A kind, a method of forming on the surface of a solid and characteristics of the silane-based surfactant will be described briefly as follows. A silane-based surfactant bonded to the surface of a solid through a covalent bond includes a trichlorosilane-based compound such as $CH_3(CH_2)_nSiCl_3$, a dichlorosilane-based compound such as $CH_3(CH_2)_nCH_3SiCl_2CH_3$ or $CH_3(CH_2)_nSiCl_2C_2H_5$, a monochlorosilane-based compound such as $CH_3(CH_2)_nSiCl(CH_3)_2$ or $CH_3(CH_2)_nSiCl_2(C_2H_5)_2$, which comprise an alkyl chain, wherein n is 0~25, preferably 10~20. Particularly, the trichlorosilane-based compound forms a stronger water-repelling thin film, since siloxane bonds are formed on the surface of a solid and between adjacent molecules. The term "water-repelling" mentioned above indicates the property of having a static contact angle with respect to pure water of 80~180°. The thickness of the thin film is in the range of 1~100 nm, preferably 4~30 nm, although the thickness is different according to the type of a film, i.e. a monomolecular film or a polymer film.

A compound that is covalently bonded to the surface of a solid includes a silane-based surfactant comprising an alkyl fluoride chain, for example, a trichlorosilane-based compound such as:
(1) $CF_3(CF_2)_7(CH_2)_2SiCl_3$ 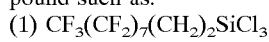
(2) $CF_3CH_2O(CH_2)_{15}SiCl_3$
(3) $CF_3(CF_2)_2Si(CH_3)_2(CH_2)_{15}SiCl_3$
(4) $CF_3(CF_2)_3(CH_2)_2Si(CH_3)_2(CH_2)_9SiCl_3$
(5) $CF_3(CF_2)_7(CH_2)_2Si(CH_3)_2(CH_2)_9SiCl_3$
(6) $CF_3COO(CH_2)_{15}SiCl_3$, $CF_3(CF_2)_5(CH_2)_2SiCl_3$ and the like, and a monochlorosilane-based or dichlorosilane-based compound substituted by a lower alkyl group such as:
(7) $CF_3(CF_2)_7(CH_2)_2SiCl_n(CH_3)_{3-n}$
(8) $CF_3(CF_2)_7(CH_2)_2SiCl_n(C_2H_5)_{3-n}$
(9) $CF_3CH_2O(CH_2)_{15}SiCl_n(CH_3)_{3-n}$
(10) $CF_3CH_2O(CH_2)_{15}SiCl_n(C_2H_5)_{3-n}$
(11) $CF_3(CH_2)_2Si(CH_3)_2(CH_2)_{15}SiCl_n(CH_3)_{3-n}$
(12) $CF_3(CF_2)_3(CH_2)_2Si(CH_3)_2(CH_2)_9SiCl_n(C_2H_5)_{3-n}$
(13) $CF_3(CF_2)_7(CH_2)_2Si(CH_3)_2(CH_2)_9SiCl_n(CH_3)_{3-n}$
(14) $CF_3COO(CH_2)_{15}SiCl_n(CH_3)_{3-n}$
(15) $CF_3(CF_2)_5(CH_2)_2SiCl_n(CH_3)_{3-n}$
(wherein n in the formulas is 1 or 2). Particularly, the trichlorosilane-based chemical adsorbent forms a stronger water-repelling thin film, since siloxane bonds are formed on the surface of a solid and between adjacent molecules.

Similarly, an alkoxy-based compound can be used as a compound covalently bonded to the surface of a solid, in which a chlorine atom of the silane-based surfactant comprising an alkyl chain and of the silane-based surfactant comprising an alkyl fluoride chain is replaced with a methoxy group or an ethoxy group. For example, in the case of using a substance expressed by a formula $CF_3-(CF_2)_n-(R)_q-SiX_p(OA)_{3-p}$ (wherein n is an integer of 1 or more, preferably an integer of 1–22, R is a substituent comprising an alkyl group, a vinyl group, an ethynyl group, an aryl group, silicon or an oxygen atom, q is 0 or 1, each of X and A is an alkyl group having a carbon number of 1–3, and p is an integer of 0–2), a more excellent coating film can be formed. However, the substance is not limited to those mentioned above, and beside the substances mentioned above the following substances also can be used: $CH_3-(CH_2)_r-SiX_p(OA)_{3-p}$, $CH_3-(CH_2)_s-O-(CH_2)_t-SiX_p(OA)_{3-p}$, $CH_3-(CH_2)_u-Si(CH_3)_2-(CH_2)_v-SiX_p(OA)_{3-p}$, $CF_3COO-(CH_2)_w-SiX_p(OA)_{3-p}$ or the like (wherein p is an integer of 0–2, r is an integer 1–25, s is an integer of 0–12, t is an integer of 1–20, u is an integer of 0–12, v is an integer of 1–20 and w is an integer of 1–25, X indicates hydrogen, an alkyl group, an alkoxyl group, a fluorine containing alkyl group or a fluorine containing alkoxy group and A is an alkyl group having a carbon number of 1–3).

Furthermore, a more specific chemical adsorbent is chosen from the following compounds:
(1) $CH_3CH_2O(CH_2)_{15}Si(OCH_3)_3$
(2) $CF_3CH_2O(CH_2)_{15}Si(OCH_3)_3$
(3) $CH_3(CH_2)_2Si(CH_3)_2(CH_2)_{15}Si(OCH_3)_3$
(4) $CH_3(CH_2)_6Si(CH_3)_2(CH_2)_9Si(OCH_3)_3$
(5) $CH_3COO(CH_2)_{15}Si(OCH_3)_3$
(6) $CF_3(CF_2)_5(CH_2)_2Si(OCH_3)_3$
(7) $CF_3(CF_2)_7-C_6H_4-Si(OCH_3)_3$
(8) $CH_3CH_2O(CH_2)_{15}Si(OC_2H_5)_3$
(9) $CH_3(CH)_2Si(CH_3)_2(CH_2)_{15}Si(OC_2H_5)_3$
(10) $CH_3(CH_2)_6Si(CH_3)_2(CH_2)_9Si(OC_2H_5)_3$
(11) $CF_3(CH_2)_6Si(CH_3)_2(CH_2)_9Si(OC_2H_5)_3$
(12) $CH_3COO(CH_2)_{15}Si(OC_2H_5)_3$
(13) $CF_3COO(CH_2)_{15}Si(OC_2H_5)_3$
(14) $CF_3COO(CH_2)_{15}Si(OCH_3)_3$
(15) $CF_3(CF_2)_9(CH_2)_2Si(OC_2H_5)_3$
(16) $CF_3(CF_2)_7(CH_2)_2Si(OC_2H_5)_3$
(17) $CF_3(CF_2)_5(CH_2)_2Si(OC_2H_5)_3$
(18) $CF_3(CF_2)_7C_6H_4Si(OC_2H_5)_3$
(19) $CF_3(CF_2)_9(CH_2)_2Si(OCH_3)_3$

(20) $CF_3(CF_2)_5(CH_2)_2Si(OCH_3)_3$
(21) $CF_3(CF_2)_7(CH_2)_2SiCH_3(OC_2H_5)_2$
(22) $CF_3(CF_2)_7(CH_2)_2SiCH_3(OCH_3)_2$
(23) $CF_3(CF_2)_7(CH_2)_2Si(CH_3)_2OC_2H_5$
(24) $CF_3(CF_2)_7(CH_2)_2Si(CH_3)_2OCH_3$.

A covalent bond includes a siloxane bond expressed by Si—O— and a bond expressed by Si—N—. In the case where the chemical adsorbents mentioned above react with a hydroxyl group on the surface of a substrate, a Si—O bond is formed, and in the case where the chemical adsorbents mentioned above react with an amino group on the surface of a substrate, a Si—N bond is formed.

A chlorosilane-based compound used in the examples may have not only a linear form but also a branched form as well as a form in which a terminal silicon is substituted by an alkyl fluoride group or a hydrocarbon group (for example, a general formula $R^1SiCl_3$, $R^1R^2SiCl_2$, $R^1R^2R^3SiCl$, etc., wherein each of $R^1$, $R^2$ and $R^3$ indicates an alkyl fluoride group or a hydrocarbon group). However, a linear form is generally preferable in order to increase the density of the film.

In order to form a thin film comprising an alkyl chain or an alkyl fluoride chain on the surface of a solid through a covalent bond, a chlorosilane-based surfactant is dissolved in a nonaqueous organic solvent not having active hydrogen, and a substrate on which a thin film should be formed is dipped therein for a predetermined time and then is dried. A nonaqueous organic solvent used is preferably any one of the following solvents: a fluorine-based solvent such as, for example, 1,1-dichloro, 1-fluoroethane, 1,1-dichloro, 2,2,2-trifluoroethane, 1,1-dichloro, 2,2,3,3,3-pentafluoropropane, 1,3-dichloro, 1,1,2,2,3-pentafluoropropane, trifluoroalkylamine, perfluorofuran or a fluoroalkyl derivative thereof; a hydrocarbon-based solvent such as, for example, hexane, octane, hexadecane, cyclohexane or the like; an ether-based solvent such as, for example, dibutyl ether, dibenzyl ether or the like; and an ester-based solvent, for example, methyl acetate, ethyl acetate, isopropyl acetate, amyl acetate or the like.

After dissolving a chlorosilane-based surfactant in a nonaqueous organic solvent and then dipping a substrate therein on which a film should be formed, which causes a chemical reaction, it is also possible to form a monomolecular film by washing the substrate with a nonaqueous solvent without bringing the substrate into contact with water. In addition, a water-repelling thin film can be also formed by directly applying to the substrate a solvent in which a chlorosilane-based surfactant is dissolved.

In the following examples, a volume electric resistivity, a film thickness and a static contact angle of pure water were measured according to the following measuring methods respectively.

(1) A volume electric resistivity: a thin film was formed on a silicon substrate by the same method, and a mercury bulb having a diameter of 2 mm was brought into contact with the substrate (a contact area of 0.785 mm$^2$). A voltage of 1V was applied between the silicon substrate and the mercury bulb, and then a volume electric resistivity was measured, thus calculating the volume electric resistivity.

(2) A film thickness: a thin film was formed on a silicon substrate by the same method and then the film thickness was measured with an ellipsometer.

(3) A static contact angle of pure water: a pure water in an amount of about $5\mu$ litre was dropped onto the substrate on which a thin film has been formed and the contact angle was measured.

Example 1

A water-repelling film was formed on a plate (size : 30 cm×40 cm) for placing a sheet in an overhead projector by the following method. In this case, the material of the surface of the plate for accepting a sheet was glass. The glass was washed with running pure water for 5 minutes after being washed with a neutral detergent using a sponge and then was dried in a nitrogen atmosphere for 3 hours. As a next step, $CF_3(CF_2)_7(CH_2)_2SiCl_3$ was dissolved in a non-aqueous mixed solvent of hexadecane and chloroform (the volume ratio of 4:1) so as to have a concentration of 30 mmol/L, and the glass substrate was dipped therein for 2 hours, wherein the temperature was room temperature (25° C.). By the dipping treatment, a dehydrochlorination reaction expressed by the following chemical formula (1) occurred between a chloro group of the chlorosilane and a hydroxyl group (—OH) of the glass surface.

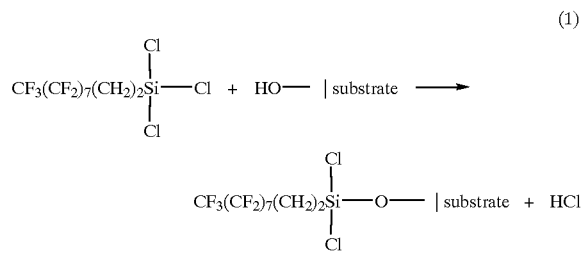

(1)

Next, the glass was taken out and was dipped immediately into chloroform, thus removing unreacted chlorosilane surfactants. The glass was then washed with running pure water for 5 minutes. As a result, a hydrolysis reaction expressed by the following chemical formula (2) occurred.

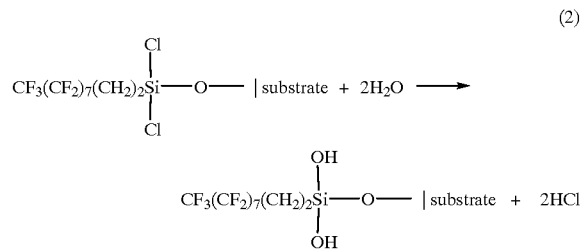

(2)

Then the glass was dried and a cross-linking reaction expressed by the following chemical formula (3) occurred.

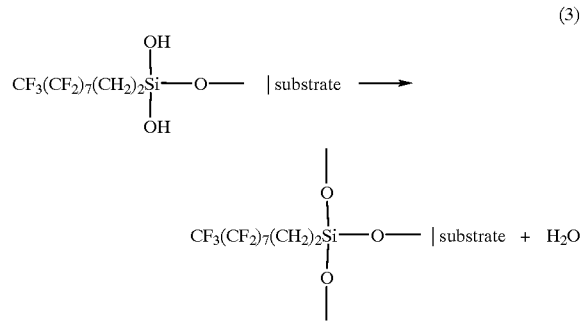

(3)

The static contact angle of pure water on the glass treated as mentioned above was 110 degrees. That is, a high water-repelling property was provided to the glass. The volume electric resistivity was $1.3\times10^{13} \Omega\cdot cm$.

As a next step, the glass was installed in an overhead projector and the overhead projector was placed in an atmosphere having a room temperature of 25° C. and a relative humidity of 50%. After rubbing an OHP sheet (made of a polyethylene terephthalate film) with the glass surface several times, the OHP sheet was placed on the glass surface and the overhead projector was inclined at an angle of 45 degrees. The sheet remained in the state adhering on the glass surface more than 10 minutes. The adhesion was caused by the charged state. Next, the same experiment was carried out in an atmosphere having a temperature of 25° C. and a relative humidity of 80%. The sheet remained in the state adhering on the glass surface stably more than 10 minutes.

As a comparative example, the same experiment was carried out using a glass on which a thin film had not been formed. The sheet fell off from the glass surface within 30 seconds in an atmosphere having a temperature of 25° C. and a relative humidity of 50% and within 10 seconds in an atmosphere having a temperature of 25° C. and a relative humidity of 80%. Thus, it was found that stable adherence for the OHP sheet was provided to the glass surface in the overhead projector.

The transparency of the glass is retained, since the monomolecular layer of the water-repelling thin film formed in the example has a thickness of only 4 nm. Furthermore, cleaning is easy, since marker ink or the like can be removed easily from the water-repelling glass.

Example 2

A plate for placing a sheet was washed as in Example 1. Next, a cloth was impregnated with a solution prepared by adding 5 wt. % of $CF_3(CF_2)_7(CH_2)_2Si(OCH_3)_3$ into ethanol and the solution was applied to the plate for placing a sheet using the cloth. The plate then was heated at 100° C. for 10 minutes.

The static contact angle of pure water on the glass plate treated as mentioned above was 108 degrees. That is, a high water-repelling property was provided to the surface of the glass plate. The volume electric resistivity was $1.3 \times 10^{18} \Omega \cdot cm$ and the film thickness was 80 nm.

The sheet was rubbed and was then placed on the plate as in Example 1. In an atmosphere having a temperature of 25° C. and a relative humidity of 50%, the sheet remained in the state adhering on the glass surface more than 8 minutes.

In the Example, $CF_3(CF_2)_7(CH_2)_2Si(OCH_3)_3$ was used, but the same result also was obtained when using $CF_3(CF_2)_7(CH_2)_2Si(OC_2H_5)_3$.

Example 3

A thin film having a thickness of about 30 nm as in Example 1 was formed on a bulletin board having a size of 200 cm×100 cm. The material used for the bulletin board was ABS resin. Firstly, the bulletin board was wiped with a cloth impregnated with ethanol, thus wiping off dirt. Next, a cloth made of cotton was impregnated with a solution composed of 1 wt. % of $CH_3(CH_2)_{17}SiCl_3$ and 99 wt. % of hexadecane and the solution was applied to the bulletin board using the cloth. The hexadecane comprising $CH_3(CH_2)_{17}SiCl_3$ was wiped off with a cloth made of cotton impregnated with ethanol.

The static contact angle of pure water on the ABS resin plate treated as mentioned above was 85 degrees. That is, a high water-repelling property was provided to the plate. The volume electric resistivity was $7.3 \times 10^{13} \Omega \cdot cm$ and the film thickness was 30 nm.

The bulletin board on which a thin film had been formed as mentioned above was placed in an atmosphere having a room temperature of 25° C. and a relative humidity of 50%. After rubbing a paper several times, the paper adhered to the bulletin board and remained in the adhering state more than 10 minutes. Next, the same experiment was carried out in an atmosphere having a temperature of 25° C. and a relative humidity of 80%. The sheet remained in the state adhering on the glass surface at least more than 10 minutes.

As a comparative example, the same experiment was carried out using a bulletin board on which a thin film had not been formed. The paper fell off from the bulletin board within 1 minute in an atmosphere having a temperature of 25° C. and a relative humidity of 50% and within 30 seconds in an atmosphere having a temperature of 25° C. and a relative humidity of 80%. Thus, it was found that stable adherence for the paper to the bulletin board was provided.

Example 4

A thin film having a thickness of 30 nm as in Example 1 was formed on a drafting board having a size of 100 cm×50 cm. The material used for the drafting board was polyurethane resin. Firstly, the drafting board was wiped with a cloth impregnated with ethanol, thus wiping off dirt. Next, a cloth made of cotton was impregnated with hexadecane comprising 1 wt. % of $CF_3(CF_2)_7(CH_2)_2SiCl_3$ and the hexadecane was applied to the drafting board using the cloth. The hexadecane comprising $CF_3(CF_2)_7(CH_2)_2SiCl_3$ was wiped off with a cloth made of cotton impregnated with ethanol.

The static contact angle of pure water on the polyurethane resin plate treated as mentioned above was 118 degrees. That is, a high water-repelling property was provided. The volume electric resistivity was $1.6 \times 10^{15} \Omega \cdot cm$ and the film thickness was 30 nm.

The drafting board on which a thin film had been formed as mentioned above was placed in an atmosphere having a room temperature of 25° C. and a relative humidity of 50%. After rubbing a paper with the drafting board several times, the paper adhered to the drafting board and remained in the state adhering more than 10 minutes. Next, the same experiment was carried out in an atmosphere having a temperature of 25° C. and a relative humidity of 80%. The sheet remained in the state adhering more than 10 minutes.

As a comparative example, the same experiment was carried out using a drafting board on which a thin film had not been formed. The sheet fell off from the drafting board within 1 minute in an atmosphere having a temperature of 25° C. and a relative humidity of 50% and within 30 seconds in an atmosphere having a temperature of 25° C. and a relative humidity of 80%. Thus, it was found that stable adherence for the drafting paper to the drafting board was provided. In addition, an effect that adhering dirt, marker ink, pencil or the like can be removed easily is obtained because of the low surface energy in the thin film of the present invention.

Example 5

A thin film having a thickness of about 30 nm as in Example 1 was formed on a plate (having a size of 30 cm×40 cm) for placing a paper in a plotter device. The material used for the plate for placing a paper in a plotter device was ABS resin. Firstly, the plate for placing a paper in a plotter device was wiped with a cloth impregnated with ethanol, thus wiping off dirt. Next, a cloth made of cotton was impregnated with hexadecane comprising 1 wt. % of $CF_3(CF_2)_7$ $(CH_2)_2SiCl_3$ and the hexadecane was applied to the plate for placing a paper in a plotter device using the cloth. The hexadecane comprising $CF_3(CF_2)_7(CH_2)_2SiCl_3$ then was wiped off with a cloth made of cotton impregnated with ethanol.

The static contact angle of pure water on the ABS resin plate treated as mentioned above was 123 degrees. That is, a high water-repelling property was provided. The volume electric resistivity was $1.6\times10^{15}\Omega\cdot cm$ and the film thickness was 30 nm.

The plate for placing a paper in a plotter device on which a thin film had been formed as mentioned above was placed in an atmosphere having a room temperature of 25° C. and a relative humidity of 50%. After rubbing a paper with the plate several times, the paper adhered to the plate for placing a paper and remained in the state adhering more than 10 minutes. Next, the same experiment was carried out in an atmosphere having a temperature of 25° C. and a relative humidity of 80%. The sheet remained in the state adhering on the plate more than 10 minutes.

As a comparative example, the same experiment was carried out using a plate for placing a paper in a plotter device on which a thin film had not been formed. The adherence between the paper and the plate for placing a paper was eliminated within 2 minute in an atmosphere having a temperature of 25° C. and a relative humidity of 50% and within 40 seconds in an atmosphere having a temperature of 25° C. and a relative humidity of 80%.

In a plotter device of the present invention, large parts such as a glow discharge device for the purpose of charging the plate for placing a paper or the like are not necessary, since a paper adheres simply by forming a thin film on the plate for placing a paper. Consequently, a small and inexpensive device is possible.

Example 6

As in Example 5, a thin film was formed on a plate (an alumina ceramic coating film having a thickness of 3 μm formed by thermal spraying on a plate made of stainless steel, a size of 30 cm×40 cm) for placing a paper in a plotter device. The paper was rubbed several times and adhered.

The sheet remained in the state adhering more than 10 minutes in an atmosphere having a temperature of 25° C. and a relative humidity of 50%. The static contact angle of pure water on the ceramic plate was 130 degrees. That is, a high water-repelling property was provided. The volume electric resistivity was $1.6\times10^{15}\Omega\cdot cm$ and the film thickness was 30 nm.

As a comparative example, the same experiment was carried out using a plate for placing a paper in a plotter device on which a thin film had not been formed. The paper did not adhere at all in an atmosphere having a temperature of 25° C. and a relative humidity of 50%.

Example 7

A water-repelling coating film was formed on a plate for placing a sheet in a reflection overhead projector by the following method. In this case, this plate for placing a sheet was made by providing a reflection coating on the back of the plate made of polycarbonate.

Firstly, a hard coating film was provided on the surface of the plate for placing a sheet for the purpose of improving hardness of the surface. A phosphazene-based hard coating film (trade name: PPZ-U-1000; manufactured by Kyoei Chemical Co., Ltd. in Japan) was applied as a hard coating film and then was irradiated with ultraviolet ray using a low pressure mercury lamp in an air atmosphere having a room temperature of 25° C. for 3 minutes.

A thin film was formed on this plate for placing a sheet as in Example 1. The static contact angle of pure water on the plate treated as mentioned above and made of polycarbonate resin was 130 degrees. That is, a high water-repelling property was provided. The volume electric resistivity was $1.3\times10^{13}\Omega\cdot cm$ and the film thickness was 4 nm.

After rubbing an OHP sheet (made of a polyethylene terephthalate film) onto the plate obtained, the sheet was placed on the plate. The sheet remained in the state adhering on the glass surface because of being in a charged state more than 10 minutes in an atmosphere having a temperature of 25° C. and a relative humidity of 50%.

When an electrically chargeable material of the Examples is used in an adhesion device, an overhead projector, a bulletin device, a drafting machine, a plotter device or the like, a charged state can be maintained for a long time even in an atmosphere having a high relative humidity. Consequently, a paper, a vinyl sheet or the like can adhere for a long time. Moreover, a thin film formed on a dielectric material is not limited to a material composed of a chlorosilane compound, and the thin film can be also formed from, for example, an ethoxysilane compound or a methoxysilane compound.

This invention should be considered as defined by the appended claims rather than as limited to the Examples mentioned above.

What is claimed is:

1. An electrically chargeable substrate and a sheet that can be adhered to said substrate with a static charge, the electrically chargeable substrate comprising a thin film composed of a silane-based compound comprising $CH_3(CH_2)_nSi(O-)_3$ repeating units, where n is between 0 and 25 or $CF_3(CF_2)_n(CH_2)_2Si(O-)_3$ repeating units, where n is between 0 and 25, the silane-based compound bonded to the surface of an electrically insulating substrate through a covalent bond;

wherein a volume electric resistivity of the electrically insulating substrate on which a thin film has not yet been formed is in the range of $1\times10^{7}-1\times10^{19}\Omega\cdot cm$; the thin film has a thickness in the range of 1–100 nm and a volume electric resistivity in the range of $1\times10^{11}-1\times10^{19}\Omega\cdot cm$; and the sheet is adhered to the electrically chargeable substrate through the static charge that can be generated by rubbing the sheet on the thin film of the electrically chargeable substrate.

2. The electrically chargeable substrate according to claim 1, wherein the silane-based compound is at least one compound selected from a chlorosilane-based compound, an ethoxysilane-based compound or a methoxysilane-based compound.

3. The electrically chargeable substrate according to claim 1, wherein the electrically insulating substrate is at least one substrate selected from glass, plastic or ceramic.

4. The electrically chargeable substrate according to claim 1, wherein the electrically insulating substrate is at least one substrate selected from a plate for placing a sheet in an OHP, a bulletin board of a bulletin device, a drafting board of a drafting machine, or a plate for placing a paper in a plotter device.

5. The electrically chargeable substrate according to claim 1, wherein the thickness of the thin film is in the range of 4~30 nm.

6. The electrically chargeable substrate according to claim 1, wherein the contact angle between the thin film and water is in the range of 80~180 degrees.

7. The electrically chargeable substrate according to claim 1, wherein a volume electric resistivity of the thin film is in the range of $1\times10^{13}\sim1\times10^{18}\Omega\cdot cm$.

8. The electrically chargeable substrate according to claim 1, wherein the silane-based compound is bonded to the surface of the electrically insulating substrate by at least one reaction selected from a dehydrochlorination reaction or a dealcoholization reaction.

9. An apparatus for displaying a sheet through adhesion of a sheet to the apparatus with a static charge, comprising:

an electrically insulating substrate; and a thin film having a thickness in the range of 1–100 nm, the thin film comprising a silane-based compound comprising $CH_3(CH_2)_nSi(O\text{---})_3$ repeating units, where n is between 0 and 25 or $CF_3(CF_2)_n(CH_2)_2Si(O\text{---})_3$ repeating units, where n is between 0 and 25, the silane-based compound bonded to the surface of the electrically insulating substrate through a covalent bond, the electrically insulating substrate and the thin film bonded thereto forming an electrically chargeable substrate capable of displaying a sheet, wherein the sheet is adhered to the electrically chargeable substrate through the static charge that can be generated by rubbing the sheet on the thin film of the electrically chargeable substrate.

10. The apparatus for displaying a sheet according to claim 9, wherein the silane-based compound is at least one compound selected from a chlorosilane-based compound, an ethoxysilane-based compound or a methoxysilane-based compound.

11. The apparatus for displaying a sheet according to claim 9, wherein the electrically insulating substrate is at least one substrate selected from glass, plastic or ceramic.

12. The apparatus for displaying a sheet according to claim 9, wherein a volume electric resistivity of the electrically insulating substrate on which a thin film has not been formed yet is in the range of $1\times10^7\sim1\times10^{19}\Omega\cdot cm$.

13. The apparatus for displaying a sheet according to claim 9, wherein the thickness of the thin film is in the range of 4~30 nm.

14. The apparatus for displaying a sheet according to claim 9, wherein the contact angle between the thin film and water is in the range of 80~180 degrees.

15. The apparatus for displaying a sheet according to claim 9, wherein a volume electric resistivity of the thin film is in the range of $1\times10^{11}\sim1\times10^{19}\Omega\cdot cm$.

16. The apparatus for displaying a sheet according to claim 9, wherein a volume electric resistivity of the thin film is in the range of $1\times10^{13}\sim1\times10^{18}\Omega\cdot cm$.

17. The apparatus for displaying a sheet according to claim 9, wherein the silane-based compound is bonded to the surface of the electrically insulating substrate by at least on reaction selected from a dehydrochlorination reaction or a dealcoholization reaction.

18. An apparatus selected from the group consisting of an OHP, a bulletin board, a drafting machine and a plotter device, the apparatus for displaying a sheet through adhesion of a sheet to the apparatus with a static charge, comprising:

an electrically insulating substrate; and a thin film having a thickness in the range of 1–100 nm, the thin film comprising a silane-based compound comprising $CH_3(CH_2)_nSi(O\text{---})_3$ repeating units, where n is between 0 and 25 or $CF_3(CF_2)_n(CH_2)_2Si(O\text{---})_3$ repeating units, where n is between 0 and 25, the silane-based compound bonded to the surface of the electrically insulating substrate through a covalent bond, the electrically insulating substrate and the thin film bonded thereto forming an electrically chargeable substrate capable of displaying a sheet.

19. A method of adhering a sheet to an electrically chargeable substrate, the electrically chargeable substrate comprising an electrically insulating substrate and a thin film having a thickness in the range of 1–100 nm, the thin film comprising a silane-based compound comprising $CH_3(CH_2)_nSi(O\text{---})_3$ repeating units, where n is between 0 and 25 or $CF_3(CF_2)_n(CH_2)_2Si(O\text{---})_3$ repeating units, where n is between 0 and 25, the silane-based compound bonded to the surface of the electrically insulating substrate through a covalent bond, the method comprising:

rubbing the sheet on the thin film of electrically chargeable substrate so as to develop adhesion between the sheet and the electrically chargeable substrate by a static charge.

20. The method of claim 19 wherein the static charge maintains the sheet on the electrically chargeable substrate for at least 10 minutes.

21. The method of claim 19, wherein the sheet is made of at least one selected from the group consisting of plastic and paper.

22. The method of claim 19, wherein the electrically chargeable substrate is part of a device selected from the group consisting of an OHP, a bulletin board, a drafting machine and a plotter device.

* * * * *